March 13, 1934.　　　　　L. M. HILE　　　　　1,950,795
MACHINE FOR MAKING AND APPLYING WIRE HANDLES TO BASKETS
Filed Nov. 23, 1931　　　7 Sheets-Sheet 1

Inventor
Leslie M. Hile
By Arthur F. Durand
Atty.

March 13, 1934.  L. M. HILE  1,950,795
MACHINE FOR MAKING AND APPLYING WIRE HANDLES TO BASKETS
Filed Nov. 23, 1931  7 Sheets-Sheet 2

Inventor
Leslie M. Hile
By Arthur F. Durand
Atty.

March 13, 1934.    L. M. HILE    1,950,795
MACHINE FOR MAKING AND APPLYING WIRE HANDLES TO BASKETS
Filed Nov. 23, 1931    7 Sheets-Sheet 4

Inventor
Leslie M. Hile
By Arthur F. Durand
Atty.

March 13, 1934.   L. M. HILE   1,950,795
MACHINE FOR MAKING AND APPLYING WIRE HANDLES TO BASKETS
Filed Nov. 23, 1931    7 Sheets-Sheet 6

Inventor
Leslie M. Hile
By Arthur F. Durant
Atty.

March 13, 1934.  L. M. HILE  1,950,795

MACHINE FOR MAKING AND APPLYING WIRE HANDLES TO BASKETS

Filed Nov. 23, 1931  7 Sheets-Sheet 7

Inventor
Leslie M. Hile
By Arthur F. Durand Atty.

Patented Mar. 13, 1934

1,950,795

UNITED STATES PATENT OFFICE 1,950,795

MACHINE FOR MAKING AND APPLYING WIRE HANDLES TO BASKETS

Leslie M. Hile, Benton Harbor, Mich.

Application November 23, 1931, Serial No. 576,701

42 Claims. (Cl. 140—93)

This invention relates to machines for making and applying wire handles to baskets, such as bushel and half-bushel baskets, and similar containers.

Generally stated, the object of the invention is to provide a novel and improved construction and arrangement whereby more effective bending and clinching means are employed, than heretofore, for bending the wire ends, after they are inserted inwardly through the basket rim, upwardly and across the upper edge of the basket rim, and then around the side portions of the handle and back again a distance over the upper edge of the rim, thereby to hook the wire end portions around the vertical side portions of the handle, and in order to insure wire handles which will not be liable to work loose and which will not injure the contents of the basket when manipulated to fasten a basket cover in place.

Another object is to provide a novel and improved combination wire feeding and wire cutting mechanism for feeding and cutting off the wire from which the handles are made, in a manner to insure a more satisfactory functioning of the mechanism for forming and attaching the handles to the baskets.

In some respects, it will be seen that this application covers certain improvements on the basket handling machine shown and described in prior application No. 561,410, filed September 5, 1931.

It is also an object to provide certain details and features of construction and combinations tending to increase the general efficiency and the desirability of a basket handling machine of this particular character.

To these and other useful ends, the invention consists in the matters hereinafter set forth and claimed, and shown in the accompanying drawings, in which,—

Figure 1:
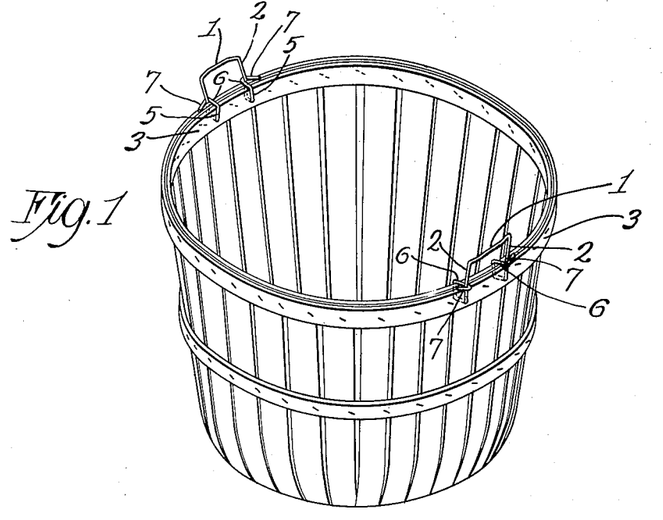
Fig. 1 is a perspective of a basket provided with handles of the kind made and attached by a machine embodying the principles of the invention.
Figure 2:
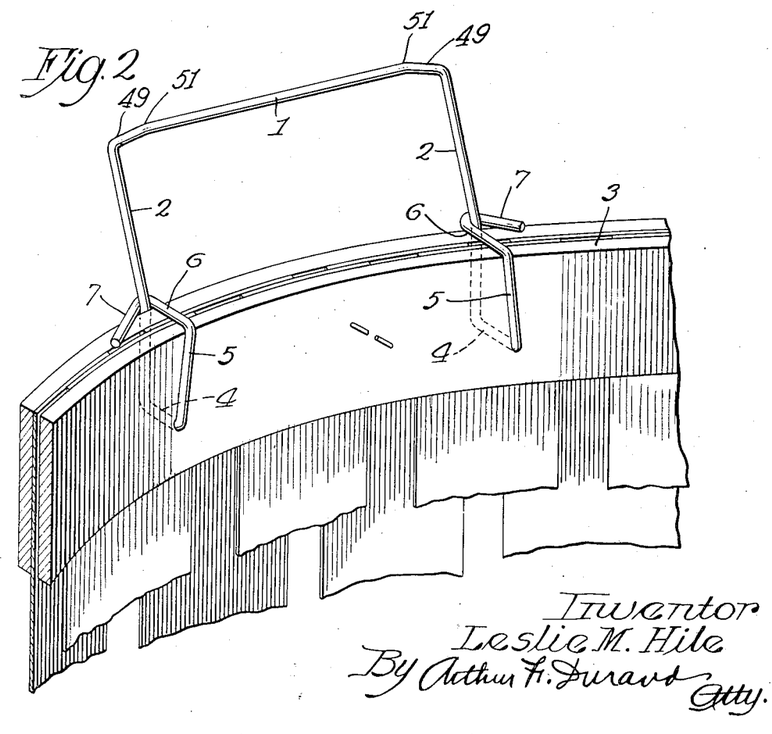
Fig. 2 is an enlarged fragmentary perspective, showing one of the handles and the adjacent portions of the basket.

As thus illustrated, and referring to Figs. 1 and 2, it will be seen that the handles to be made and applied to the baskets are each of bail-shaped form, each handle comprising a horizontal top portion 1, vertically disposed side portions 2, extending downwardly outside of the basket rim 3, lower horizontal portions 4 inserted through the basket rim, inner vertical portions 5, upper horizontal portions 6 extending over the basket-rim edge, and final end portions 7 which are hooked around the side portions 2 and caused to extend back a distance over the basket-rim edge. To insert and fasten the handles in place, in the manner thus shown, in a more effective manner than heretofore, is the object of the machine shown and described as follows:

As shown in the drawings (see Figs. 3, 6, 9, and 10), the machine comprises a front support 8 upon which the rim of the basket is supported, with the lower portion of the basket resting on the supports 9, which latter are of any suitable character, the basket thus being supported with its open side toward the machine, and with its axis in more or less horizontal position. With the arrangement shown, the said horizontally disposed axis will tilt upward at its outer end about fifteen degrees, so that the top side of the tapered basket will be horizontal. It will be understood that one handle is made and inserted in the rim of the basket, at one side of the basket, and then the basket is then taken off and turned around until the opposite side of the basket is then in position to have the other handle applied thereto.

Figure 9:
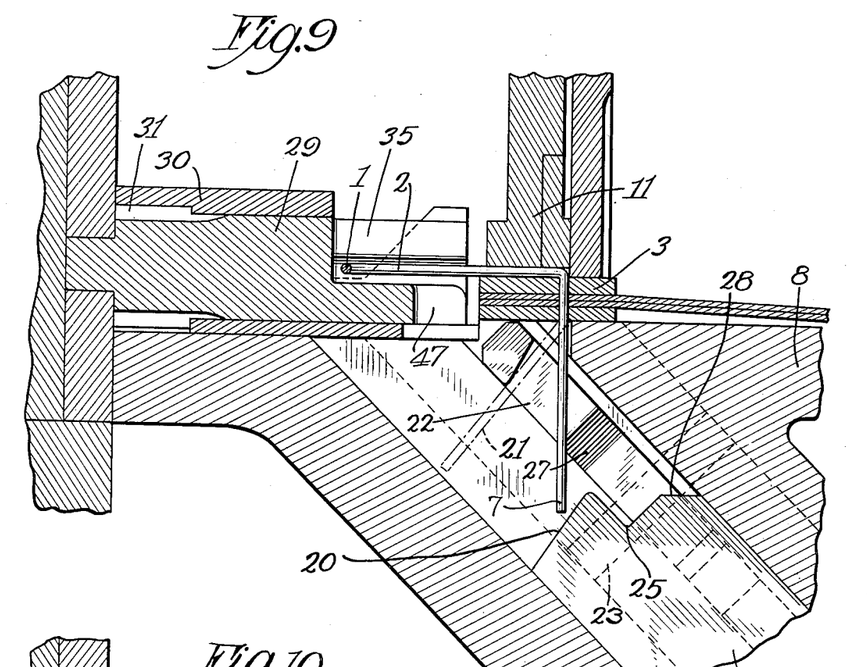
Fig. 9 is a detail section on line 9—9 in Fig. 8 of the drawings, showing the parts in certain positions.

The machine has bail-forming mechanism 10, of any suitable, known or approved character, such as that ordinarily employed for this purpose, for initially forming the wire in bail shape, with straight legs, preparatory to the bending of the leg ends at right angles, and the insertion thereof through the basket rim. Such insertion is accomplished by the handle driving mechanism 11, which latter is also of any suitable, known or approved form, such as the mechanism ordinarily employed for this purpose. Fig. 9 shows the stage of the process or method of making and applying the handles whereby the bail-shaped preliminary blank, so to speak, has been bent with its end portions at right angles, and whereby these right-angle end portions have been inserted through the basket rim 3, downwardly therethrough, practically at right angles to the axis of the basket. There is no novelty in the mechanism for forming the preliminary U-shaped blanks from the wire, and there is no novelty in the mechanism for bending the wire ends at right angles and inserting them through the basket rim, and hence these portions of the machine require no further description.

Figure 8:
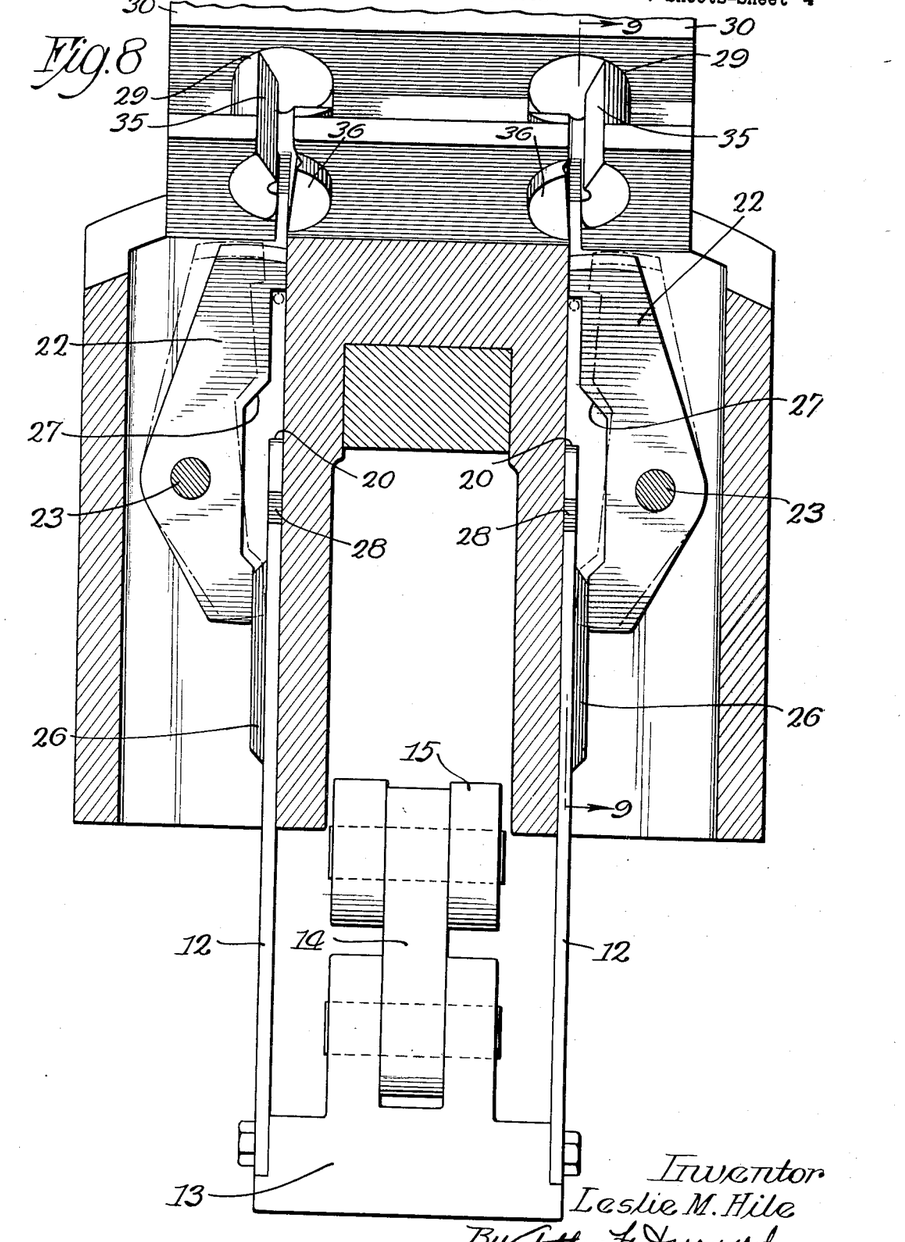
Fig. 8 is an enlarged detail section on line 8—8 in Fig. 6 of the drawings.
Figure 10:
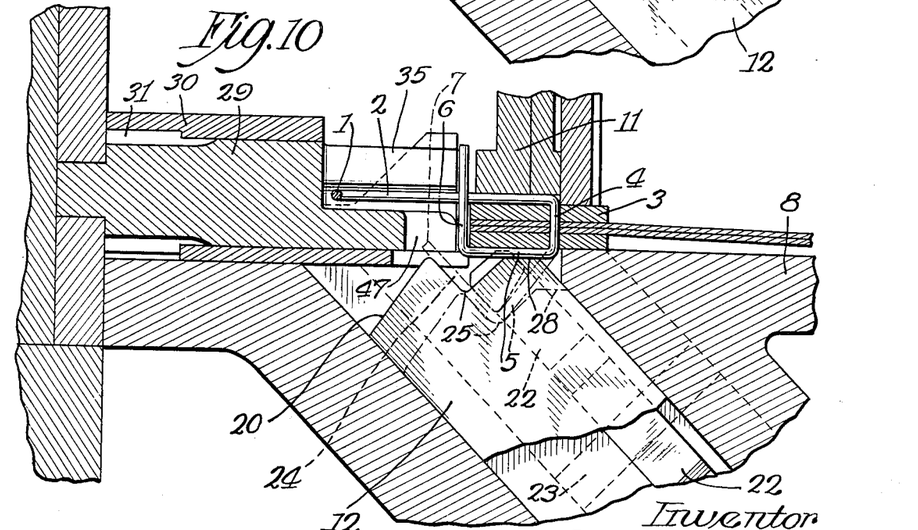
Fig. 10 is a similar view, showing the parts in different positions.

One feature of novelty in this case is the mechanism for deflecting the wire ends against the outer side of the basket rim, after they are fully inserted, and for thereafter bending these wire end portions across the basket-rim edge and hooking them around the side portions of the handle, which mechanism is as follows: As shown in Figs. 9 and 10, the deflectors and clinchers 12 are in the form of plates rigidly secured at their outer ends to the head block or casting 13, which latter is connected by a link 14 with the bell crank 15 pivoted at 16 on a stationary portion of the machine, below the support 8 previously mentioned. This bell crank 15 is operated by a pitman 17, which latter is in turn operated by a cam 18 mounted on the shaft 19 below. This shaft is driven by power in any suitable or desired manner. The inner ends of the deflectors or clinchers 12 are provided with portions 20 that initially bend the wire ends into the position shown in dotted lines at 21 in Fig. 9 of the drawings, by the endwise movement of the clinchers 12, caused by the cam 18 in properly timed relation to the other elements of the machine. At this point, the wire end portions meet the engaging portions of the pivoted anvils or loop bars 22, which latter are pivoted at 23 to any suitable stationary portion of the machine. The clinchers 12, continuing their endwise movement, the wire ends are bent around these anvils or loop bars, as shown in dotted lines at 24 in Fig. 10 of the drawings, with the previously mentioned portions 5 and 6 of the handle resting in the right-angle notches 25 of the said clinchers. The operation continuing, the clinchers 12 move on endwise, causing their cams 26 on their sides to release the rear ends of the anvils or loop bars 22, and to engage the cams 27 on said anvils or loop bars, thus pushing the latter out of the paths of the clinchers 12, as indicated in dotted lines in Fig. 8 of the drawings. This permits the clinchers 12 to finish their stroke, causing the beveled portions 28 of the clinchers to bend the handle portions 5 flatwise against the inner side of the basket rim, and causing the portions 6 to extend over the basket-rim edge, as shown in Fig. 10 of the drawings. Thus the end portions of the handle are effectively bent into position to have the final or extreme ends of the wire hooked around the side portions of the handle.

Figures 3, 4, 5:
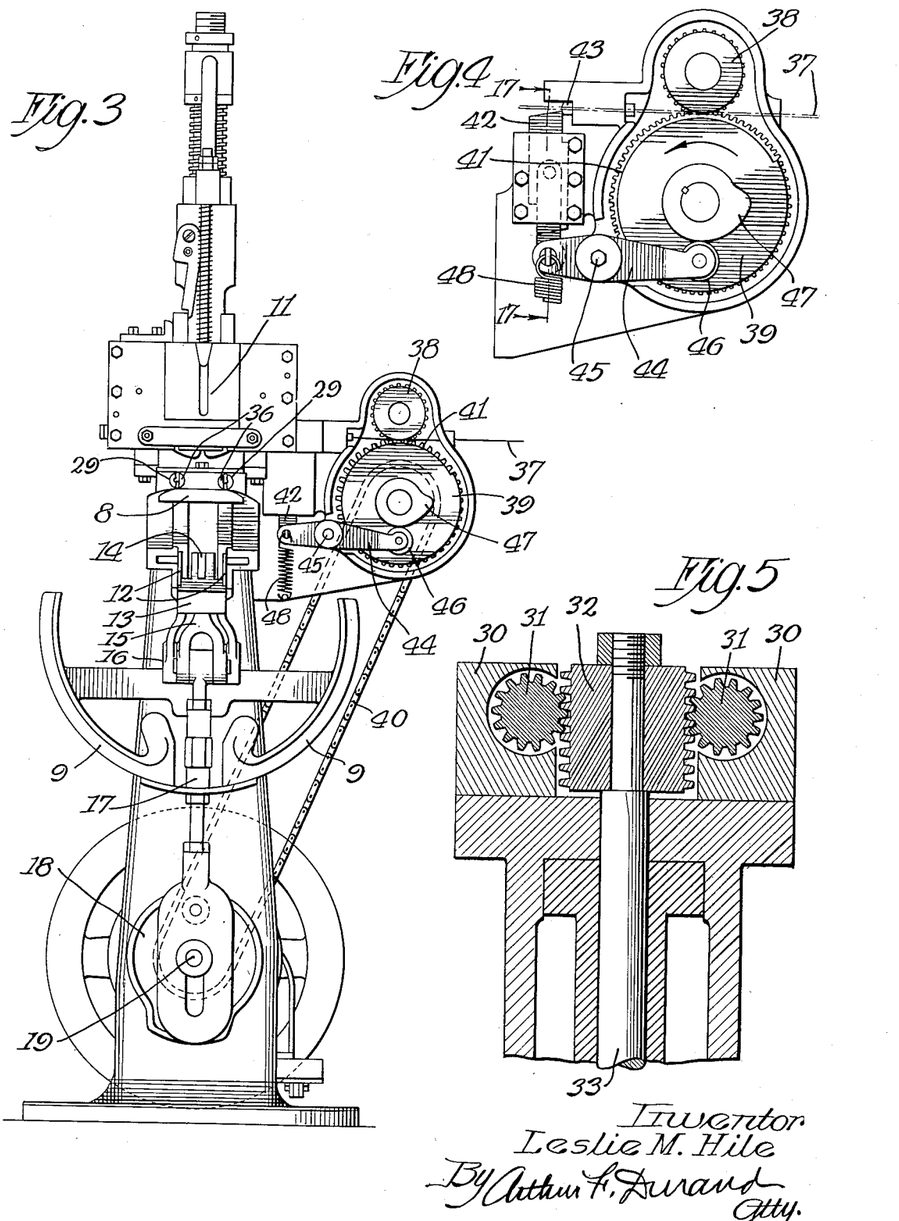
Fig. 3 is a front elevation of said machine.
Fig. 4 is an enlarged front elevation of the wire feed mechanism, as shown in Fig. 3 of the drawings, and the device for cutting off the wire.
Fig. 5 is an enlarged vertical section through the rack and pinion gearing of the twisters that twist the wire ends around the side portions of the handle, as will hereinafter more fully appear.
Figures 6, 7:
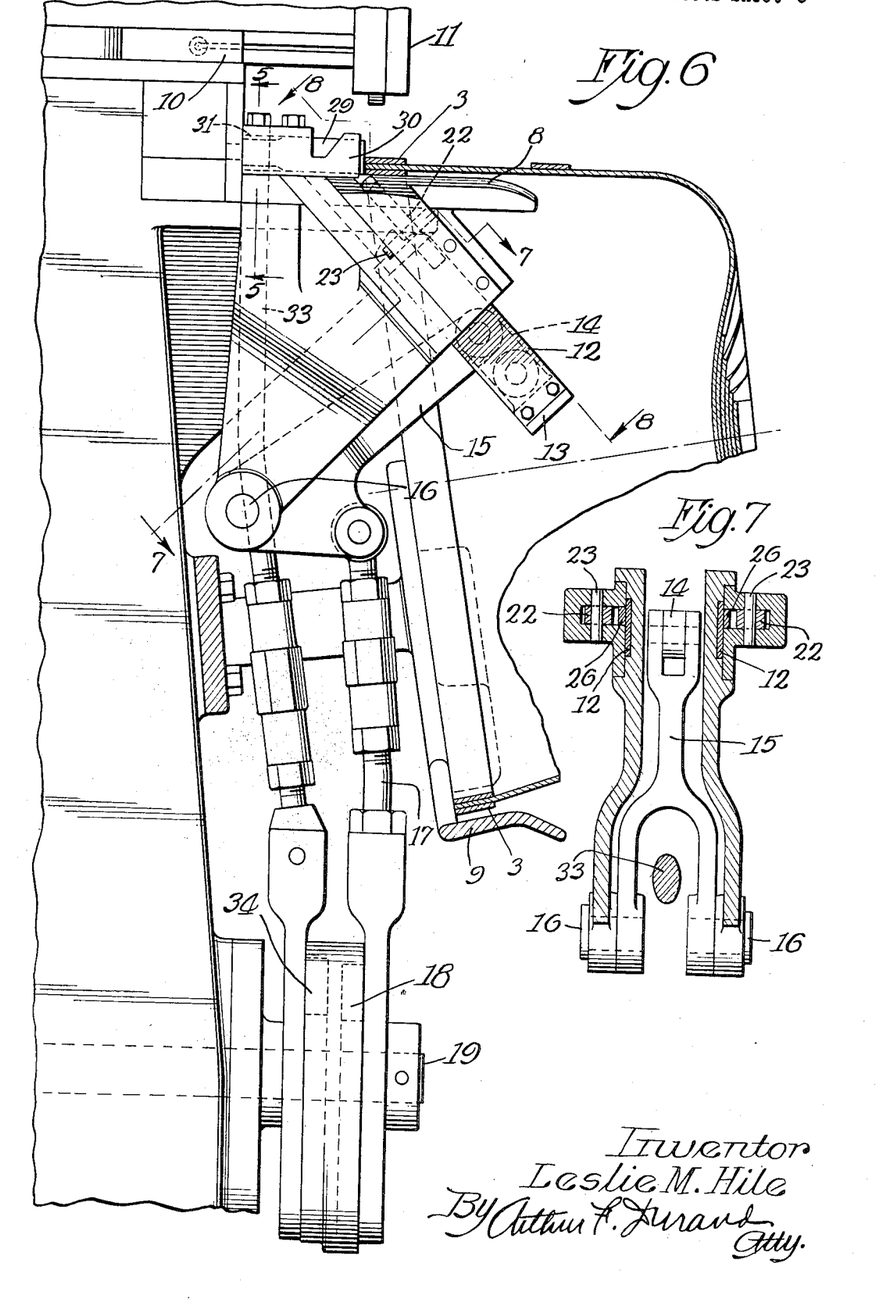
Fig. 6 is an enlarged side elevation of a portion of the front of the machine, showing the devices for initially clinching or deflecting the wire ends toward the outer side of the basket rim, and then over the edge of the rim, as will hereinafter more fully appear.
Fig. 7 is a detail section on line 7—7 in Fig. 6 of the drawings.
Figure 11:
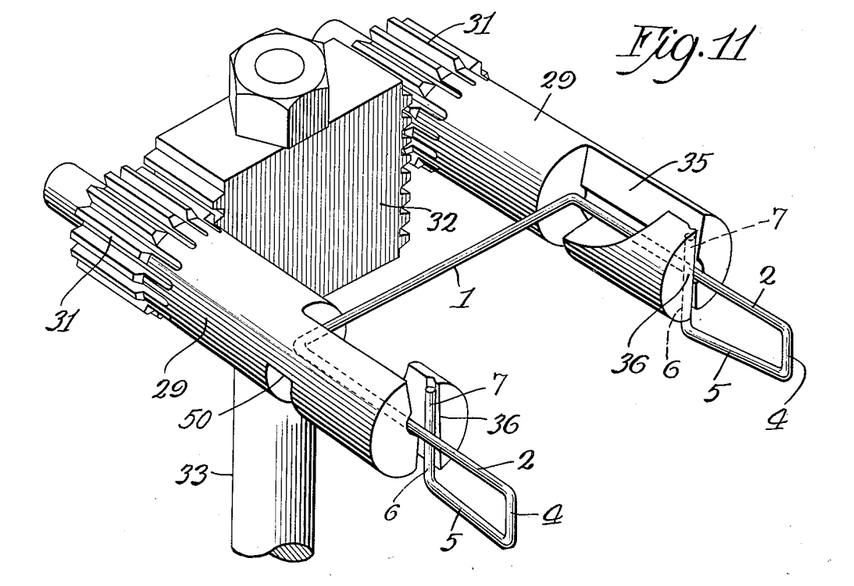
Fig. 11 is a perspective of the rack and pinion gearing and the twisters previously mentioned, showing the parts in certain positions.
Figure 12:
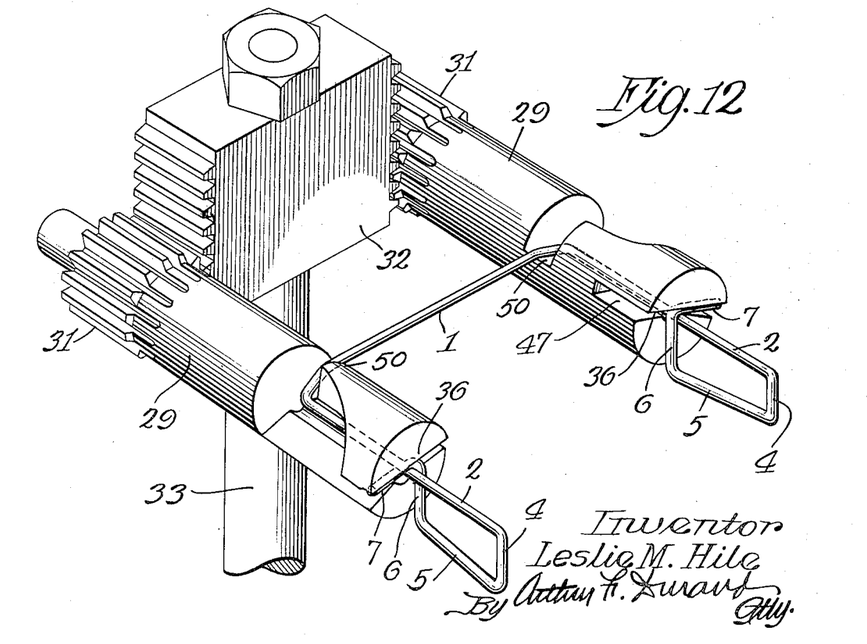
Fig. 12 is a similar view, showing the parts in different positions.

The mechanism for hooking the wire ends around the side portions of the handle is old and well known, and is shown in Figs. 5, 11 and 12 of the drawings. As thus illustrated, the said mechanism for twisting or hooking the wire ends around the side portions of the handle comprises a pair of cylindrical and oscillatory twisters 29, mounted in the stationary blocks 30 of the machine and provided with pinions 31 at their rear ends. These pinions are engaged by the vertically reciprocating double rack 32, which latter is operated by the pitman 33 connected to the cam 34 adjacent the cam 18 previously mentioned, whereby the shaft 19 operates both cams, and not only causes the operation of the bell crank 15, but also of the double rack 32, whereby the twisters 29 are oscillated in the manner indicated, thereby to hook the wire ends 7 around the side portions of the handle. For this purpose, the twisters 29 are provided with recesses 35 cut away at their inner sides to accommodate the transverse top portion of the handle, and formed at their ends with shoulder portions 36 that engage the wire ends 7 and bend the latter around the side portions 2 of the handle, as illustrated in Figs. 11 and 12 of the drawings. Thus, when the double rack 32 moves upwardly, the twisters 29 are partially rotated to bend the wire ends as shown in Fig. 2 of the drawings, and to slightly spring the side portions 2 of the handle, so that the top portion 1 is inclined outwardly when the handle is finished, as shown more clearly in Fig. 2 of the drawings. When the double rack 32 moves downward, the twisters 29 are then restored to their normal positions, as shown in Fig. 11 of the drawings, in readiness to receive the wire ends of the next handle. In itself, this twisting mechanism is old in prior machines, but is new in combination with the clinching mechanism of Figs. 8, 9 and 10, whereby the wire is more effectively delivered to the said twisting mechanism, and the operation of applying or attaching the handle is more effectively and satisfactorily performed.

Obviously, the wire must be cut off quite a distance from the bail former 10, in order to provide straight legs for the U-shaped blank, of sufficient length to insure wire end portions that can be inserted through the basket rim and then bent back into engagement with the sides of the handle, in the manner shown and described. For this purpose, therefore, a new combined wire feed and cutter is provided, as follows: As shown in Figs. 3 and 4 of the drawings, the wire 37 is fed across the path of the bail former 10 by the feed rolls 38 and 39, shown in Figs. 3 and 4 of the drawings. It will be seen that the two rolls are geared together and are operated continuously by a sprocket chain 40 leading to a sprocket on the shaft 19 previously mentioned, whereby the two rolls are driven continuously. However, the feed produced by these rolls is intermittent because of the fact that the roll 39 is multilated, being cut away for a portion of its circumference at 41, as shown in Fig. 4 of the drawings, whereby this roll only coacts with the roll 38 for a portion of the rotation of the roll 39, thus feeding the wire intermittently. A vertically reciprocating cutter 42 is arranged adjacent the wire feed mechanism thus provided, to co-operate at its upper end with the guide tube 43 through which the wire is fed. The lower end of the cutter 42 is connected to the lever 44, which is pivoted at 45 on a stationary portion of the machine. Said arm 44 has a roller 46 which engages the cam 47 on the side of the feed roll 39 previously mentioned. A spring 48, attached to the cutter, or to the joint between the cutter and the lever arm 44, exerts its tension to pull the cutter downwardly, while the cam 47 is operative to force the cutter upwardly into co-operative relation to the feed tube 43, thereby to shear off or cut the wire, during the non-feeding motion of the feed rolls, leaving a length of wire in the forming mechanism 10 of the right length to provide a U-shaped wire blank of the desired size, or of a size necessary for the ultimate handle. It will be understood that the cam 47 is operated in suitably timed relation to the other elements of the machine, whereby the wire is cut off as soon as the feed rolls 38 and 39 have fed the desired length of wire into the path of the former 10 of the machine. In this way the problem of cutting the wire off at the proper time is simplified, and is imposed on the wire feed mechanism, instead of on the forming mechanism, whereby the latter is not required to participate by its operation in the cutting of the wire, but needs only to do the forming which is necessary as a preliminary to the insertion of the wire ends through the basket rim.

Thus, by the clinching mechanism shown and described, the wire portions 5 and 6 are preliminarily bent at an acute angle to each other, as shown in Fig. 10 of the drawings, whereby the portions 6 will tightly hug the upper edge of the basket rim, when the bending is in the stage shown in full lines in Fig. 10 of the drawings. In this way, the portions 6, being sprung slightly to assume a position at right angles to the portions 5, will tightly hug the upper edge of the basket rim, preliminary to the hooking of the portions 7 of the wire around the side portions of the handle, in the manner shown and described. In other words, the portions 6 are bent at an angle to the portions 5, prior to the bending of the portions 5 against the inner side of the basket rim, and the portions 5 and 6 then practically move in unison to their ultimate positions, instead of forcing the portions 6 endwise across the edge of the basket rim, and thereby flattening the portions 5 against the inner side of the basket rim. This insures a very tight grip of the basket-handle end-portions upon the basket rim, when the basket leaves the handling machine, whereby the basket is received by the user with its handles in good condition. In fact, the handles are in such condition that they are then free to be manipulated, in order to fasten the basket cover in place, without loosening the handles and without danger of rocking any portion of the handles in a manner to injure the fruit or other contents of the basket.

Thus the clinchers 12 and the loop bars or anvils 22 are disposed in a common plane extending at an oblique angle to the axis of the basket.

It will also be seen that, with the wire cutter 42, 43 associated with the wire feeding mechanism, it is possible to have the wire cut off at practically any desired distance from the forming position of the wire article.

As shown in Fig. 12, it will be seen that the handle portion 1 is formed with two oblique portions 49 at the ends thereof, so that the handle portion 1 is not straight entirely across between the two side portions of the handle. These two bends in the handle portion 1 are formed by the twisters 29, when they are rotated in the position in which they are shown in Fig. 12, the lower edges 50 of the recesses 35 engaging the underside of the handle portion 1, thus pressing upwardly on this handle portion, the points 51, while the twister portions 36 press the side portions of the handle downward. This initial action of the twisters causes the bending of the handle portion 1 in the manner shown. In this way, the straight top portion of the handle is offset outwardly so that it is not in the vertically disposed plane of the side portions of the handle, and in addition this straight top portion of the handle is a little above the upper ends of the side portions of the handle, whereby the oblique portions 50 between the side portions and the top portion of the handle extend downwardly and inwardly toward the basket when the handle is attached in place.

As a matter of further and special improvement, and because of the character of the clinching mechanism used, the twisters 29 are provided with slots 47, which slots extend from the ends of the twisters back a distance toward the pinions 31, as shown in Figs. 11 and 12 of the drawings. When the clinching mechanism is in operation, as shown in Figs. 9 and 10, the wire portions 7 are bent upwardly, and the slots 47 provide clearance for these wire ends, as the latter are moved upwardly. Finally, these portions 7 arrive in the positions shown in Fig. 11 of the drawings, and the twisters 29 bend these portions in the manner shown in Fig. 12 of the drawings.

Figures 14, 15, 16, 17:
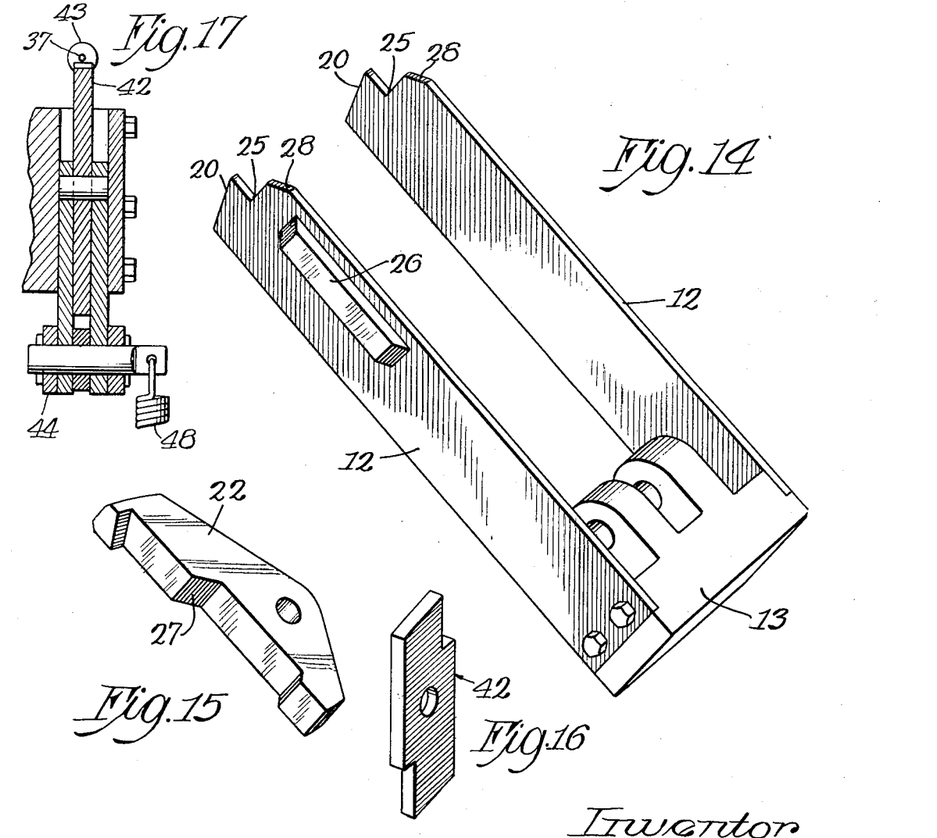
Fig. 14 is a perspective of the reciprocating clinchers.
Fig. 15 is a perspective of one of the wire bending elements.
Figs. 16 and 17 are detail views of the wire cutter.

As a matter of further improvement, the wire cutter 42 is preferably made as shown in Figs. 16 and 17 of the drawings, the cutter itself being a detachable plate which is reversible, end for end, so that when the cutter is dulled or worn out at one end it can then be reversed to use its other end.

Figure 13:
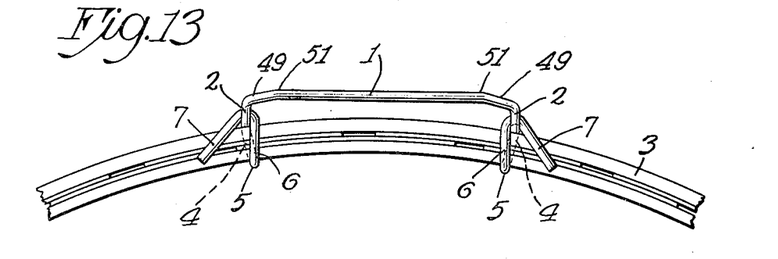
Fig. 13 is a top view looking down on one of the handles attached to the basket.

By bending the handle in the manner shown and described, as will be seen from Fig. 13, the relatively long straight middle portion 1 of the handle is offset outwardly to a point outside of the plane of the side portions 2 of the handle, which latter preferably incline outwardly as shown in Fig. 2 of the drawings. While the twisters 29 are pressing down on the wire end portions 7, as shown in Fig. 12 of the drawings, the twister edges 50 are pressing upwardly at the points 51 on the handle, thereby offsetting the relatively long straight top portion of the handle outwardly and upwardly, relatively to the side portions 2 of the handle, whereby the machine is effective to form handles that will be less liable to interfere with the stacking of the baskets. The points 51, therefore, are in the nature of obtuse angles formed in the top portion of the handle, and this is preferably accomplished by the elements that bend the hook ends 70 around the sides 2 of the handle, as illustrated in Figs. 11 and 12 of the drawings. Therefore, the recesses 35 and the shoulder portions 36 and the edges 50 of the twisters must be relatively formed, and timed in their action, to affect the bending of the handle in the manner shown and described.

What I claim as my invention is:

1. In a machine for attaching wire handles to baskets, by inserting the handle end portions through the basket rim, the combination of means for supporting the basket rim in position to receive the said inserted end portions, and instrumentalities including endwise reciprocating clinchers operating simultaneously in parallel straight lines for bending the handle end portions into engagement with the basket rim, together with means to actuate said reciprocating clinchers.

2. A structure as specified in claim 1, including mechanism operative subsequently to the operation of said clinchers, thereby to bend the handle ends into engagement with the side portions of the handle.

3. A structure as specified in claim 1, said reciprocating clinchers being formed to first bend the end portions of the handle at an angle to the portions extending through the basket rim, and adapted thereafter to bend these end portions in angular form, and to then press these angular portions into engagement with the inner side and the upper edge of the basket rim.

4. A structure as specified in claim 1, said reciprocating clinchers being formed to first bend the end portions of the handle at an angle to the portions extending through the basket rim, and adapted thereafter to bend these end portions in angular form, and to then press these angular portions into engagement with the inner side and the upper edge of the basket rim, together with twister mechanism operative subsequently to the operation of said clinchers, thereby to twist and bend the final wire ends into engagement with the side portions of the handle.

5. A structure as specified in claim 1, said clinchers each having a right-angle notch, each having a beveled portion, thereby to bend the wire end portions into angular portions, and to thereafter force these angular portions against the inner side and the upper edge of the basket rim.

6. A structure as specified in claim 1, in combination with movable anvils or loop bars co-operating with said clinchers to bend the wire end portions into angular portions, adapted thereafter to move out of the path of the clinchers, thereby permitting further movement of the clinchers to bend and press the wire into engagement with the basket rim.

7. A structure as specified in claim 1, said clinchers comprising a pair of flat plates rigidly connected together, actuated in unison, in combination with a pair of pivoted anvils or loop bars co-operating with said clinchers to bend the handle end portions in the desired manner.

8. In a machine for attaching wire handles to baskets, the combination of pivoted anvils or loop bars, disposed in position to engage the end portions of the wire projecting through the basket rim, inside the basket, and elements co-operating therewith, operative to engage and bend the previously inserted wire end portions around portions of the anvils or loop bars preliminary to the forcing of the wire into engagement with the basket rim.

9. A structure as specified in claim 8, there being reciprocating cams for actuating said anvils or loop bars into and out of the planes in which the wire end portions are bent.

10. A structure as specified in claim 8, said anvils or loop bars being movable in a common plane disposed obliquely to the axis of the basket.

11. A structure as specified in claim 8, in combination with twister mechanism for operation subsequent to the operation of said anvils or loop bars, thereby to twist or bend the final wire ends into engagement with the side portions of the handle.

12. A structure as specified in claim 8, said co-operating elements being adapted to reciprocate endwise in a plane disposed obliquely to the axis of the basket, and said anvils or loop bars being operable in the same plane.

13. A structure as specified in claim 8, said co-operating elements being adapted to reciprocate endwise in a plane disposed obliquely to the axis of the basket.

14. A structure as specified in claim 8, said co-operating elements being adapted to co-operate with said anvils or loop bars to bend the wire end portions into acute angle portions, preliminary to the bending of these angle portions into engagement with the inner side and the upper edge of the basket rim, causing the bent wire portions to fit the rim tightly.

15. A structure as specified in claim 8, said co-operating elements being adapted to co-operate with said anvils or loop bars to bend the wire end portions into acute angle portions, preliminary to the bending of these angle portions into engagement with the inner side and the upper edge of the basket rim, causing the bent wire portions to fit the rim tightly, in combination with twister mechanism operative to twist or bend the final wire ends into hooked engagement with the side portions of the handle.

16. A structure as specified in claim 8, said co-operating elements being adapted to co-operate with said anvils or loop bars to bend the wire end portions into acute angle portions, preliminary to the bending of these angle portions into engagement with the inner side and the upper edge of the basket rim, causing the bent wire portions to fit the rim tightly, in combination with twister mechanism operative to twist or bend the final wire ends into hooked engagement with the side portions of the handle, causing the ends of said hooks to be disposed immediately outside the said handle side portions.

17. In a machine for attaching wire handles to baskets, by inserting the handle end portions through the basket rim, and thereafter causing the handle end portions to extend across the inner side of the basket rim, then outwardly across the basket-rim edge, then around the handle side portions, and then back a distance over the rim edge, the combination of means for supporting the basket rim in position to receive the inserted end portions of the handle, and clinching means for bending the handle end portions into parallel angle portions, and for thereafter forcing these angle portions into tight engagement with the inner side and the upper edge of the basket rim.

18. A structure as specified in claim 17, said clinching means being adapted to bend said angle portions at acute angles, whereby these angle portions are sprung back into right angle portions when they are forced into tight engagement with the basket rim.

19. In a machine for forming articles from wire, the combination of a wire feed mechanism for intermittently feeding the wire, a reciprocating wire cutter to cut off the required length of wire each time the feeding motion thereof is interrupted, lever means operating about an axis extending at right-angles to the wire to operate said cutter, and means on said mechanism to actuate said lever means, in combination with a feed tube co-operating with the end of said cutter to sever the wire.

20. In a machine for attaching wire handles to containers, the combination of instrumentalities for inserting the end portions of the sides of the handle through the rim of the container, and co-operating elements to bend the top portion of the handle obliquely at each end thereof.

21. A structure as specified in claim 20, comprising means whereby said elements are also effective to bend the sides of the handle outward.

22. A structure as specified in claim 20, said elements comprising rotary twisters operative to hook the wire ends around the sides of the handle, while bending the handle top as stated.

23. A structure as specified in claim 20, said elements comprising rotary twisters operative to bend the sides of the handle outward, and to hook the wire ends around the handle sides at the points where the latter are bent.

24. In machinery for attaching wire handles to containers, the combination of means for inserting the handle through the container rim, clinching mechanism for bending the wire ends over the basket rim, and rotary twisters for bending the wire ends around the side portions of the handle, each twister being provided with a slot to provide clearance for the wire ends in the operation of said clinching mechanism.

25. A structure as specified in claim 24, said slots extending longitudinally of the rotary twisters, each slot having a shoulder at its outer end.

26. A structure as specified in claim 24, said slots extending from the forward ends of said twisters back a distance toward the rear ends thereof, and each twister having means for engaging the top portion of the handle.

27. In a machine for making and inserting wire devices, the combination of feed rolls for feeding the wire, and a cutter for severing the wire, operated by the operation of said feed rolls, having a lever pivoted to oscillate about an axis parallel with the axes of said rolls, said cutter having a detachable reciprocating cutter plate mounted in a guide to reciprocate in a straight line, with a link connecting said plate to said lever.

28. A structure as specified in claim 27, said feed rolls having a cam on one roll for actuating the cutter, there being a spring for retracting the cutter.

29. In a machine for attaching wire handles to baskets, by inserting the handle end portions through the basket rim, the combination of means for supporting the basket rim in position to receive the said inserted end portions, and instrumentalities including endwise reciprocating clinchers for bending the handle end portions into engagement with the basket rim, together with means to actuate said reciprocating clinchers, said reciprocating clinchers being formed to first bend the end portions of the handle at an angle to the portions extending through the basket rim, and adapted thereafter to bend these end portions in angular form, and to then press these angular portions into engagement with the inner side and the upper edge of the basket rim, together with twister mechanism operative subsequently to the operation of said clinchers, thereby to twist and bend the final wire ends into engagement with the side portions of the handle.

30. In a machine for attaching wire handles to baskets, by inserting the handle end portions through the basket rim, the combination of means for supporting the basket rim in position to receive the said inserted end portions, and instrumentalities including endwise reciprocating clinchers for bending the handle end portions into engagement with the basket rim, together with means to actuate said reciprocating clinchers, said clinchers each having a right-angle notch, each having a beveled portion, thereby to bend the wire end portions into angular portions, and to thereafter force these angular portions against the inner side and the upper edge of the basket rim.

31. In a machine for attaching wire handles to baskets, by inserting the handle end portions through the basket rim, the combination of means for supporting the basket rim in position to receive the said inserted end portions, and instrumentalities including endwise reciprocating clinchers for bending the handle end portions into engagement with the basket rim, together with means to actuate said reciprocating clinchers, in combination with movable anvils or loop bars co-operating with said clinchers to bend the wire end portions into angular portions, adapted thereafter to move out of the path of the clinchers, thereby permitting further movement of the clinchers to bend and press the wire into engagement with the basket rim.

32. In a machine for attaching wire handles to baskets, by inserting the handle end portions through the basket rim, the combination of means for supporting the basket rim in position to receive the said inserted end portions, and instrumentalities including endwise reciprocating clinchers for bending the handle end portions into engagement with the basket rim, together with means to actuate said reciprocating clinchers, said clinchers comprising a pair of flat plates rigidly connected together, actuated in unison, in combination with a pair of pivoted anvils or loop bars co-operating with said clinchers to bend the handle end portions in the desired manner.

33. In a machine for attaching wire handles to baskets, the combination of pivoted anvils or loop bars, and elements co-operating therewith, operative to engage and bend the wire end portions around portions of the anvils or loop bars preliminary to the forcing of the wire into engagement with the basket rim, in combination with twister mechanism for operation subsequent to the operation of said anvils or loop bars, thereby to twist or bend the final wire ends into engagement with the side portions of the handle.

34. In a machine for attaching wire handles to baskets, the combination of pivoted anvils or loop bars, and elements co-operating therewith, operative to engage and bend the wire end portions around portions of the anvils or loop bars preliminary to the forcing of the wire into engagement with the basket rim, said co-operating elements beng adapted to co-operate with said anvils or loop bars to bend the wire end portions into acute angle portions, preliminary to the bending of these angle portions into engagement with the inner side and the upper edge of the basket rim, causing the bent wire portions to fit the rim tightly, in combination with twister mechanism operative to twist or bend the final wire ends into hooked engagement with the side portions of the handle.

35. In a machine for attaching wire handles to baskets, the combination of pivoted anvils or loop bars, and elements co-operating therewith, operative to engage and bend the wire end portions around portions of the anvils or loop bars preliminary to the forcing of the wire into engagement with the basket rim, said co-operating elements being adapted to co-operate with said anvils or loop bars to bend the wire end portions into acute angle portions, preliminary to the bending of these angle portions into engagement with the inner side and the upper edge of the basket rim, causing the bent wire portions to fit the rim tightly, in combination with twister mechanism operative to twist or bend the final wire ends into hooked engagement with the side portions of the handle, causing the ends of said hooks to be disposed immediately outside the said handle side portions.

36. In a machine for attaching wire handles to baskets, by inserting the handle end portions through the basket rim, and thereafter causing the handle end portions to extend across the inner side of the basket rim, then across the basket-rim edge, and then around the handle side portions, the combination of means for supporting the basket rim in position to receive the inserted end portions of the handle, and clinching means for bending the handle end portions into angle portions, and for thereafter forcing these angle portions into tight engagement with the inner side and the upper edge of the basket rim, said clinching means being adapted to bend said angle portions at acute angles, whereby these angle portions are sprung back into right angle portions when they are forced into tight engagement with the basket rim.

37. In a machine for attaching wire handles to containers, the combination of instrumentalities for inserting the end portions of the sides of the handle through the rim of the container, and co-operating elements to bend the top portion of the handle obliquely at each end thereof, said instrumentalities thereby operative to form the top of the handle with a relatively long middle portion between two relatively short oblique portions, thereby offsetting said relatively long middle portion outwardly to a point outside the plane of the downwardly extending side portions of the handle.

38. A structure as specified in claim 37, said elements being formed with portions for clinching the handle ends while bending the handle top as stated.

39. A structure as specified in claim 37, said elements being formed to slightly offset the middle portion of the handle upwardly, relatively to the side portions of the handle.

40. A structure as specified in claim 19, said feed mechanism comprising continuously operating feed rolls, operating about horizontal axes, one of which rolls is mutilated to cause the intermittent feeding of the wire, with a cam associated with the mutilated feed roll to actuate the wire cutter.

41. A structure as specified in claim 19, including a spring for retracting said wire cutter vertically, and means for inserting the wire device while said mechanism is operating but not feeding.

42. A structure as specified in claim 19, the association of the vertical wire cutter with said wire feeding mechanism permitting the wire to be cut off practically at any desired distance from the vertical forming position of the wire article, and means for inserting the wire device while said mechanism is operating but not feeding.

LESLIE M. HILE.